(12) United States Patent
Ng

(10) Patent No.: US 6,531,548 B1
(45) Date of Patent: Mar. 11, 2003

(54) BLENDS OF POLY(1,3-PROPYLENE 2,6-NAPHTHALATE)

(75) Inventor: Howard Chung-Ho Ng, Kingston (CA)

(73) Assignee: E. I. Du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/786,169

(22) PCT Filed: Aug. 26, 1999

(86) PCT No.: PCT/US99/19623

§ 371 (c)(1),
(2), (4) Date: Feb. 28, 2001

(87) PCT Pub. No.: WO00/12628

PCT Pub. Date: Mar. 9, 2000

Related U.S. Application Data

(60) Provisional application No. 60/098,675, filed on Sep. 1, 1998.

(51) Int. Cl.[7] .............................................. C08L 67/02
(52) U.S. Cl. .................... 525/444; 525/58; 525/176; 525/177; 525/400; 525/425; 525/437; 525/439
(58) Field of Search ........................ 525/444, 58, 425, 525/400, 439, 176, 177, 437

(56) References Cited

U.S. PATENT DOCUMENTS

| | | | |
|---|---|---|---|
| 3,937,754 A | | 2/1976 | Shimotsuma et al. |
| 5,300,332 A | * | 4/1994 | Kawaguchi ................ 428/34.1 |
| 5,804,626 A | * | 9/1998 | Rogers et al. |
| 5,989,665 A | * | 11/1999 | Connell et al. |

FOREIGN PATENT DOCUMENTS

| | | | |
|---|---|---|---|
| JP | 53-502570 | | 5/1978 |
| JP | 5-287067 | * | 11/1993 |
| JP | 6-100767 | | 4/1994 |

OTHER PUBLICATIONS

Poly (Alkylene 2,6–Naphthalenedicarboxylate) Polyesters, Research Disclosure 28368, Nov. 1987.

Heffelfinger et al, X–Ray Determination of the Crystallite Orientation Distributions of Polyethylene Terephthalate Films, Journal of Polymer Science, 47, 289–306, 1960.

Leroy E. Alexander, X–Ray Diffraction Methods in Polymer Science, 206–209, 1969.

Wang et al, Dynamic Study of Crystallization– and Melting–Induced Phase Separatioin in PEEK/PEKK Blends, Macromolecules, 30, 4544–4550, 1997.

Smith et al, Preparation and Properties of Poly(Methylene terephthalates), Journal of Polymer Science, 4, 1851–1859, 1966.

* cited by examiner

Primary Examiner—Patricia A. Short
(74) Attorney, Agent, or Firm—Mark D. Kuller

(57) ABSTRACT

Disclosed are physical blends of poly(1,3-propylene 2,6-naphthalate) polymer compositions with other polymers in which the concentration of poly(1,3-propylene 2,6-naphthalate) is from 1 to 99 mole %.

20 Claims, 1 Drawing Sheet

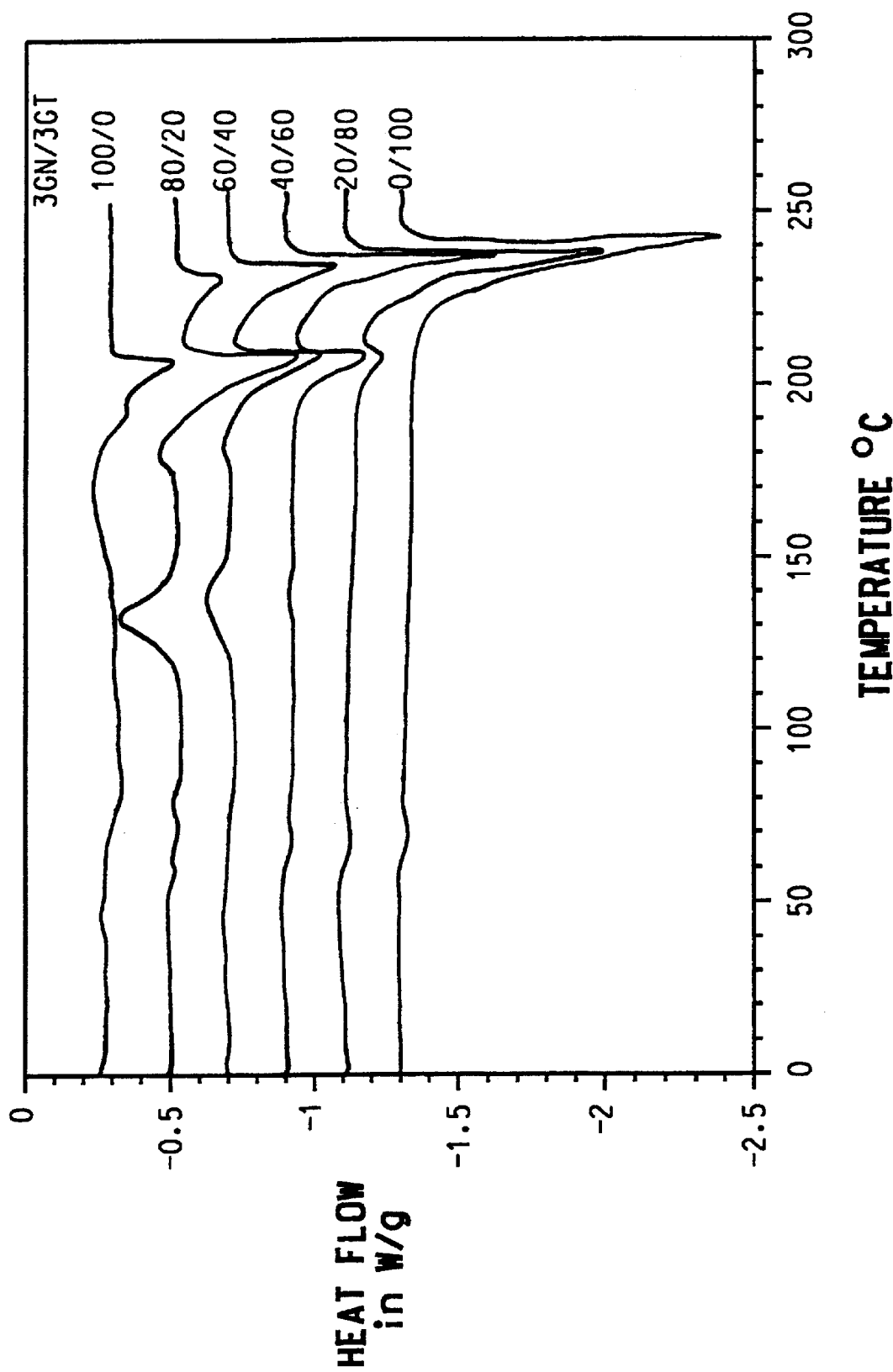

BLENDS OF POLY(1,3-PROPYLENE 2,6-NAPHTHALATE)

This application claims the benefit of provisional application 60/098,675 filed Sep. 1, 1998.

FIELD OF THE INVENTION

This invention concerns physical blends of poly(1,3-propylene 2,6-naphthalate) polymer compositions with other polymers in which the concentration of poly(1,3-propylene 2,6-naphthalate) is from 1 to 99 mole %.

TECHNICAL BACKGROUND OF THE INVENTION

This invention relates to blends of poly(1,3-propylene 2,6-naphthalate) polymers (referred to herein as 3GN polymers or 3GN) with other polymers.

U.S. Pat. No. 3,937,754 discloses a biaxially oriented polyethylene 2,6-naphthalate (PEN) film which comprises PEN containing no more than 10 mole % of non PEN forming components and 0.5 to 10% of a polyester containing at least 90 mole % of a homopolyester unit other than PEN, having a softening point at least 1° C. higher than its equilibrium softening point. Patentees teach that improvements in resistance to thermal degradation and Young's modulus are achieved after the softening point of the PEN resin has decreased and before it decreases to a point at least 1° C. higher than its equilibrium softening point. Thus, patentees teach that some, but not complete, reaction between the polyesters is necessary to achieve their desired advantages.

It is an object of the present invention to provide physical blends in which essentially no reaction between polymer components occur.

SUMMARY OF THE INVENTION

The present invention relates to compositions comprising physical blends of poly(1,3-propylene 2,6-naphthalate) polymer compositions with one or more second polymers in which the concentration of 3GN is from 1 to 99 mole % and in which essentially no reaction between the polymer components has taken place.

BRIEF DESCRIPTION OF THE DRAWINGS

FIG. 1 is a plot of Differential Scanning Calorimetry (DSC) data for various 3GN/3GT blends and pure 3GN and pure 3GT.

DETAILED DESCRIPTION OF THE INVENTION

3GN compositions of the present invention can be formed in immiscible blends with one or more other polymers. For example, blends of 3GN with other polyesters, such as, for example, poly(ethylene terephthalate), poly(ethylene 2,6-naphthalate), poly(1,3-propylene terephthalate) (3GT), or poly(1,3-propylene isophthalate) and/or copolymers thereof can be used. Other polymers which are suitable for forming immiscible blends with 3GN include ethylene vinyl alcohol and copolymers thereof, aliphatic polyamides and copolyamides, partially aromatic polyamide copolymers such as poly(1,3-xylylene adipamide), polyacetals such as poly(oxymethylene), polycarbonate, acrylic polymers such as poly(methylmethacrylate), and polyolefins and copolymers thereof such as polypropylene and polystyrene. Most preferred compositions are the following blends: poly(1,3-propylene 2,6-naphthalate) with poly(ethylene terephthalate); poly(1,3-propylene 2,6-naphthalate) with poly(1,3-propylene terephthalate); poly(1,3-propylene 2,6-naphthalate) with poly(1,3-propylene isophthalate); and poly(1,3-propylene 2,6-naphthalate) with poly(ethylene 2,6-naphthalate), wherein the concentration of poly(1,3-propylene 2,6-naphthalate) is from 1 to 99 mole %.

The blends can be prepared using methods known in the art for preparing immiscible blends, such as mixing melts continuously in a single or twin screw extruder, or batchwise in Banbury mixers. The blends according to the invention contain at least about 1 mole % to about 99 mole % 3GN. By immiscible it is meant that a differential scanning calorimetry (DSC) scan of the blends shows multiple glass transition temperatures ($T_g$), each $T_g$ being characteristic of the individual polymer components of the blend, as compared to miscible blends which exhibit a single, composition-dependent $T_g$.

When preparing 3GN blends with polyesters or other polymers that can react with 3GN during melt blending, such as polyamides, the blend should be held in the melt no more than about 10 minutes in order to minimize the degree of transesterification and copolymer formation. The melt blending temperature should be no higher than 30° C. greater than the highest melting component of the blend. Preferably, there is less than about 5 mole % copolymer formed by transesterification, as indicated by an absence of peaks in the proton and $^{13}C$ nuclear magnetic resonance spectra (detection sensitivity=1–2 mole %) other than those corresponding to the individual polymer components.

The utility of the compositions of the present invention is in the manufactures or formed articles, especially films. Certain of the compositions are especially useful in the manufacture of biaxially oriented films.

The poly(1,3-propylene 2,6-naphthalate) component of the compositions of the present invention can be prepared by transesterification of a dialkyl ester of 2,6naphthalene dicarboxylic acid and 1,3-propanediol or direct esterification of 2,6-naphthalene dicarboxylic acid and 1,3-propanediol followed by polycondensation.

For example, in a batch process, a $C_1$–$C_4$ dialkyl ester of 2,6-naphthalene dicarboxylic acid and 1,3-propanediol are reacted in an inert atmosphere such as nitrogen in a mole ratio of about 1:1.2 to about 1:3.0 in the presence of a transesterification catalyst at a temperature between about 170° C. and 245° C. at atmospheric pressure to form a monomer and a $C_1$–$C_4$ alkanol corresponding to the $C_1$–$C_4$ alkanol components of the dialkyl ester of 2,6-naphthalene dicarboxylic acid. The $C_1$–$C_4$ alkanol is removed as it is formed during the reaction. Examples of transesterification catalysts include compounds of manganese, zinc, calcium, cobalt, titanium, and antimony such as $Mn(acetate)_2$, $Zn(acetate)_2$, $Co(acetate)_2$, tetrabutyl titanate, tetraisopropyl titanate, and antimony trioxide. The resulting reaction product, comprising bis(3-hydroxypropyl) 2,6-naphthalate monomer and oligomers thereof, is then polymerized at temperatures between about 240° C. and 280° C. under a reduced pressure of below about 30 mm Hg in the presence of a polycondensation catalyst, with removal of excess 1,3-propanediol, to form 3GN having an inherent viscosity in the range of 0.2–0.8 deciliter/gram (dL/g). Examples of suitable polycondensation catalysts include compounds of antimony, titanium, and germanium such as antimony trioxide, tetrabutyl titanate, tetraisopropyl titanate. A titanium catalyst can be added prior to transesterification as both the transesterification and polycondensation catalyst. The transesterification and polycondensation reactions can also be carried out in continuous processes.

Other comonomers can be included during the preparation of the 3GN. For example, one or more other diols (other than 1,3-propanediol), preferably in an amount up to about 10 mole % based on total diol (including 1,3-propanediol and the other diol), and/or one or more other dicarboxylic acid or $C_1$–$C_4$ dialkyl ester of a dicarboxylic acid (other than 2,6-naphthalene dicarboxylic acid and $C_1$–$C_4$ diesters thereof, preferably in an amount up to about 10 mole % based on the total diacid or dialkyl ester (including the 2,6-naphthalene dicarboxylic acid or $C_1$–$C_4$ diakyl ester thereof and the other dicarboxylic acid or $C_1$–$C_4$ dialkyl ester thereof) can be added before or during the esterification or transesterification reaction. Examples of comonomers which can be used include terephthalic acid or isophthalic acid and $C_1$–$C_4$ diesters thereof, and $C_1$–$C_{10}$ glycols such as ethylene glycol, 1,4-butanediol, and 1,4-cyclohexane dimethanol.

The inherent viscosity of the 3GN can be further increased using solid phase polymerization methods. Particles of 3GN having an inherent viscosity of about 0.2–0.7 dL/g can generally be solid phased to an inherent viscosity of 0.7–2.0 dL/g by first crystallizing at a temperature of between about 165° C. and 190° C. for at least about 6 hours, preferably about 12–18 hours, followed by solid phase polymerizing under an inert atmosphere, such as a nitrogen purge, at a temperature of between about 190° C. to 220° C., preferably between about 195° C. to 205° C., for at least about 12 hours, however, the time period can range from 16–48 hours. The solid phase polymerization of the 3GN particles may also be conducted under a vacuum of about 0.5–2.0 mm Hg.

The 3GN preferably has an inherent viscosity in the film-forming range, generally between about 0.2–1.0 dL/g, more preferably 0.5–0.9 dL/g, most preferably 0.55–0.85 dL/g.

EXAMPLES

Test Methods

Inherent viscosity was measured in 60 wt % phenol/40 wt % 1,1,2,3-tetrachloroethane at 30° C. at a polymer concentration of 0.50% by weight, according to the procedure of ASTM D-4603-91.

Melting point, crystallization temperature and glass transition temperature were determined using the procedure of ASTM D-3418 (1988) using a DuPont DSC Instrument Model 2100. The heating and cooling rates were 10° C./min.

Density was measured in grams per cubic centimeter (g/cc) using the density-gradient method, according to ASTM D-1505-85.

Number average and weight average molecular weights (Mn and Mw) were measured by size exclusion chromatography using hexafluoroisopropanol as the solvent.

Nuclear magnetic resonance (NMR) spectra of 3GN blends were measured by dissolving the blends in deuterated hexafluoroisopropanol. Proton and $^{13}C$ NMR were measured on a Bruker high resolution NMR spectrometer. $^{13}C$ spectra at 400 Hz were collected with a 30-second relaxation delay and inverse-gated decoupling.

Experiment 1

This example describes the synthesis of poly (1,3-propylene 2,6-naphthalate) (3GN).

Dimethyl 2,6-naphthalenedicarboxylate (36.36 kg, 149 moles) (purchased from Amoco Chemical Company, with offices in Chicago, Ill.) and 1,3-propanediol (purchased from Degussa, with offices in Ridgefield Park, N.J.) (24.91 kg, 327.8 moles) were reacted under atmospheric pressure under nitrogen in the presence of 6.1 g of Tyzor® titanium tetraisopropoxide catalyst (100 ppm catalyst based on the total weight of ingredients and catalyst) (commercially available from E. I. du Pont de Nemours and Company, Wilmington, Del.) in 300 ml 1,3-propanediol in an agitated vessel heated with a hot oil system. The vessel was heated to 242° C. over a period of about 330 minutes. When the temperature of the reaction mixture reached 188° C., methanol started to evolve and was removed as a condensate by distillation as it was formed. Methanol evolution continued until about 180 minutes after the start of the reaction, when the temperature reached about 213° C. Excess 1,3-propanediol started to evolve, and was collected as a condensate by distillation, when the temperature reached about 217° C. and continued to evolve for another 150 minutes as the mixture was heated to 242° C.

The pressure in the reaction vessel was then reduced from about atmospheric to about 10 mm Hg while the temperature was increased to about 275° C. over a period of about 90 minutes. The pressure was then reduced further to 0.5 mm Hg while the temperature was raised to 280° C. The polymerization was allowed to proceed an additional 30 minutes to obtain a polymer having an inherent viscosity of 0.56 deciliter/gram (dL/g).

The polymer obtained was translucent white in color and was identified as poly (1,3-propylene 2,6-naphthalate) by analyzing the peaks in the C-13 NMR using hexafluoroisopropanol solvent. The polymer had a melting point of 201–203° C., a crystallization temperature of 166° C., and a glass transition temperature of 79° C. The inherent viscosity the polymer was 0.56 dL/g, with a number average molecular weight ($M_n$) of 22,000 and a weight average molecular weight ($M_w$) of 36,000.

Example 1

This example describes the preparation a 60 mole % blend of 3GN with poly(1,3-propylene terephthalate).

27.1 g (0.106 mole) of the 3GN prepared in Experiment 1 and 12.9 g (0.063 mole) of poly(1,3-propylene terephthalate) (3GT) having an inherent viscosity of 0.9 dL/g synthesized using the conditions described in J. Polym. Science A-1, (4), 1851–1859 (1966) were melt blended at 250° C. for 8 minutes under a nitrogen atmosphere in a Plasti-corder mixer (Type REE 230 V8 5 amp, made by Brabender Instruments Inc., South Hackensack, N.J.) at 100 rpm rotating speed. The resultant mixture was pulverized to about 20 mesh in a laboratory grinder and was compression molded at 250° C. for 2 minutes and then air cooled to room temperature to form an opaque pressed film of 6–7 mil (0.15–0.18 mm) thickness.

Nuclear magnetic resonance (NMR) analyses of the 3GN/3GT film showed that all of the NMR peaks observed were attributed to the individual polymer components, with no extra peaks indicating that there was substantially no co-polymerization as a result of ester interchange. Differential scanning calorimetry (DSC) showed two glass transition temperatures (Tg), 73° C. and 45° C., and two melting points Tm, 203° C. and 228° C., corresponding respectively to the Tg and Tm of the original 3GN and 3GT.

Example 2,3,4

Using the materials used in Example 1 and the melt blending methods of Example 1, blends of 3GN and 3GT in the ratios of 80:20, 40:60, and 20:80, respectively, were prepared. In all cases, nuclear magnetic resonance (NMR) analyses of the 3GN/3GT film showed that all of the NMR peaks observed were attributed to the individual polymer components, with no extra peaks indicating that there was substantially no co-polymerization as a result of ester interchange. Differential scanning calorimetry (DSC) showed two glass transition temperatures (Tg) (See Table 1), and two melting points Tm (See Table 1), corresponding respectively to the Tg and Tm of the original 3GN and 3GT.

TABLE 1

Thermal Properties of 3GT/3GN Blends
All Temperatures in ° C.

| Sample | Mole Ratio 3GN/3GT | $Tg_1$ | $Tg_2$ | $Tm_1$ | $Tm_2$ |
|---|---|---|---|---|---|
| Control 1 | 100/0 | 72 | — | 203 | — |
| Example 2 | 80/20 | 47 | 71 | 203 | 227 |
| Example 1 | 60/40 | 45 | 73 | 203 | 228 |
| Example 3 | 40/60 | 56 | 74 | 203 | 229 |
| Example 4 | 20/80 | 56 | 75 | 202 | 229 |
| Control 2 | 0/100 | 53 | — | 230 | — |

Example 5

This example describes the preparation of pressed films of a 60 mole % blend of 3GN with poly(ethylene terephthalate).

28.1 g (0.110 mole) of 3GN as prepared in Experiment 1 and 11.9 g (0.062 mole) of PET (MYLAR® X299, 0.8 dL/g) (available from E. I. du Pont de Nemours and Company, Wilmington, Del.) were melt blended at 280° C. and pulverized using the procedure described in Example 1. The blend was then compression molded at 280° C. for 2 minutes and then air cooled to form an opaque film of 6–7 mil (0.15–0.18 mm) thickness.

NMR analyses of the 3GN/PET film showed that all of the NMR peaks observed were attributed to the individual polymer components, with no extra peaks indicating that there was substantially no copolymerization as a result of ester interchange. DSC showed that the Tg of the 3GN and PET components were very close and overlapped at about 76.5° C. There were two melting peaks at 201° C. and 243° C., corresponding to the melting points of the original 3GN and PET, respectively.

What is claimed is:

1. A composition comprising a physical blend, in which essentially no reaction has taken place, of (a) from 20 mole % to 80 mole % poly(1,3-propylene 2,6-naphthalate) polymer composition with (b) from 80 mole % to 20 mole % one or more second polymers selected from the group consisting of poly(ethylene terephthalate) and poly(1,3-propylene terephthalate) or copolymers thereof.

2. The composition of claim 1 for which a differential scanning calorimetry (DSC) scan of the blend shows multiple glass transition temperatures ($T_g$), each $T_g$ being characteristic of the individual polymer components of the blend, as compared to miscible blends which exhibit a single, composition-dependent $T_g$.

3. The composition of claim 2 for which there is less than about 5 mole % copolymer formed by transesterification of the poly(1,3-propylene 2,6-naphthalate) polymer composition with the one or more second polymers, as indicated by an absence of peaks in the proton and $^{13}C$ nuclear magnetic resonance spectra (detection sensitivity=1–2 mole %) other than those corresponding to the individual polymer components.

4. The composition of claim 3 which has been melt blended at a temperature no higher than 30° C. greater than the highest melting component of the blend.

5. The composition of claim 4 which has been held in the melt no more than about 10 minutes.

6. The composition of claim 5 wherein the poly(1,3-propylene 2,6-naphthalate) polymer is prepared with (a) up to about 10 mole %, based on total diol, of one or more other diols (other than 1,3-propanediol) and/or (b) up to about 10 mole %, based on the total diacid or dialkyl ester (including the 2,6-naphthalene dicarboxylic acid or $C_1$–$C_4$ dialkyl ester thereof and the other dicarboxylic acid or $C_1$–$C_4$ dialkyl ester thereof), of one or more other dicarboxylic acid or $C_1$–$C_4$ dialkyl ester of a dicarboxylic acid (other than 2,6-naphthalene dicarboxylic acid and $C_1$–$C_4$ diesters thereof).

7. The composition of claim 6 in the form of a film.

8. The composition of claim 7 wherein the film is a biaxially oriented film.

9. The composition of claim 1 for which there is less than about 5 mole % copolymer formed by transesterification of the poly(1,3-propylene 2,6-naphthalate) polymer composition with the one or more second polymers, as indicated by an absence of peaks in the proton and $^{13}C$ nuclear magnetic resonance spectra (detection sensitivity=1–2 mole %) other than those corresponding to the individual polymer components.

10. The composition of claim 1 which has been melt blended at a temperature no higher than 30° C. greater than the highest melting component of the blend.

11. The composition of claim 10 which has been held in the melt no more than about 10 minutes.

12. The composition of claim 1 wherein the poly(1,3-propylene 2,6-naphthalate) polymer is prepared with (a) up to about 10 mole %, based on total diol, of one or more other diols (other than 1,3-propanediol) and/or (b) up to about 10 mole %, based on the total diacid or dialkyl ester (including the 2,6-naphthalene dicarboxylic acid or $C_1$–$C_4$ dialkyl ester thereof and the other dicarboxylic acid or $C_1$–$C_4$ dialkyl ester thereof), of one or more other dicarboxylic acid or $C_1$–$C_4$ dialkyl ester of a dicarboxylic acid (other than 2,6-naphthalene dicarboxylic acid and $C_1$–$C_4$ diesters thereof).

13. The composition of claim 1 wherein the one or more second polymers is the poly(1,3-propylene terephthalate).

14. The process of claim 13 wherein the composition has less than about 5 mole % copolymer formed by transesterification of the poly(1,3-propylene 2,6-naphthalate) polymer composition with the one or more second polymers, as indicated by an absence of peaks in the proton and $^{13}C$ nuclear magnetic resonance spectra (detection sensitivity= 1–2 mole %) other than those corresponding to the individual polymer components.

15. The composition of claim 1 wherein the one or more second polymers is the poly(ethylene terephthalate).

16. The composition of claim 1 in the form of a film.

17. The composition of claim 16 wherein the film is a biaxially oriented film.

18. A process of preparing the composition of claim 1 comprising providing the poly(1,3-propylene 2,6-naphthalate) polymer composition and the one or more second polymers, and melt blending them at a temperature no higher than 30° C. greater than the highest melting component of the blend so that essentially no reaction takes place between the poly(1,3-propylene 2,6-naphthalate) polymer composition and the one or more second polymers.

19. The process of claim 18 wherein the composition is held in the melt no more than about 10 minutes.

20. The process of claim 19 wherein the composition is such that a differential scanning calorimetry (DSC) scan of the blend shows multiple glass transition temperatures ($T_g$), each $T_g$ being characteristic of the individual polymer components of the blend, as compared to miscible blends which exhibit a single, composition-dependent $T_g$.

* * * * *